Patented Mar. 26, 1946

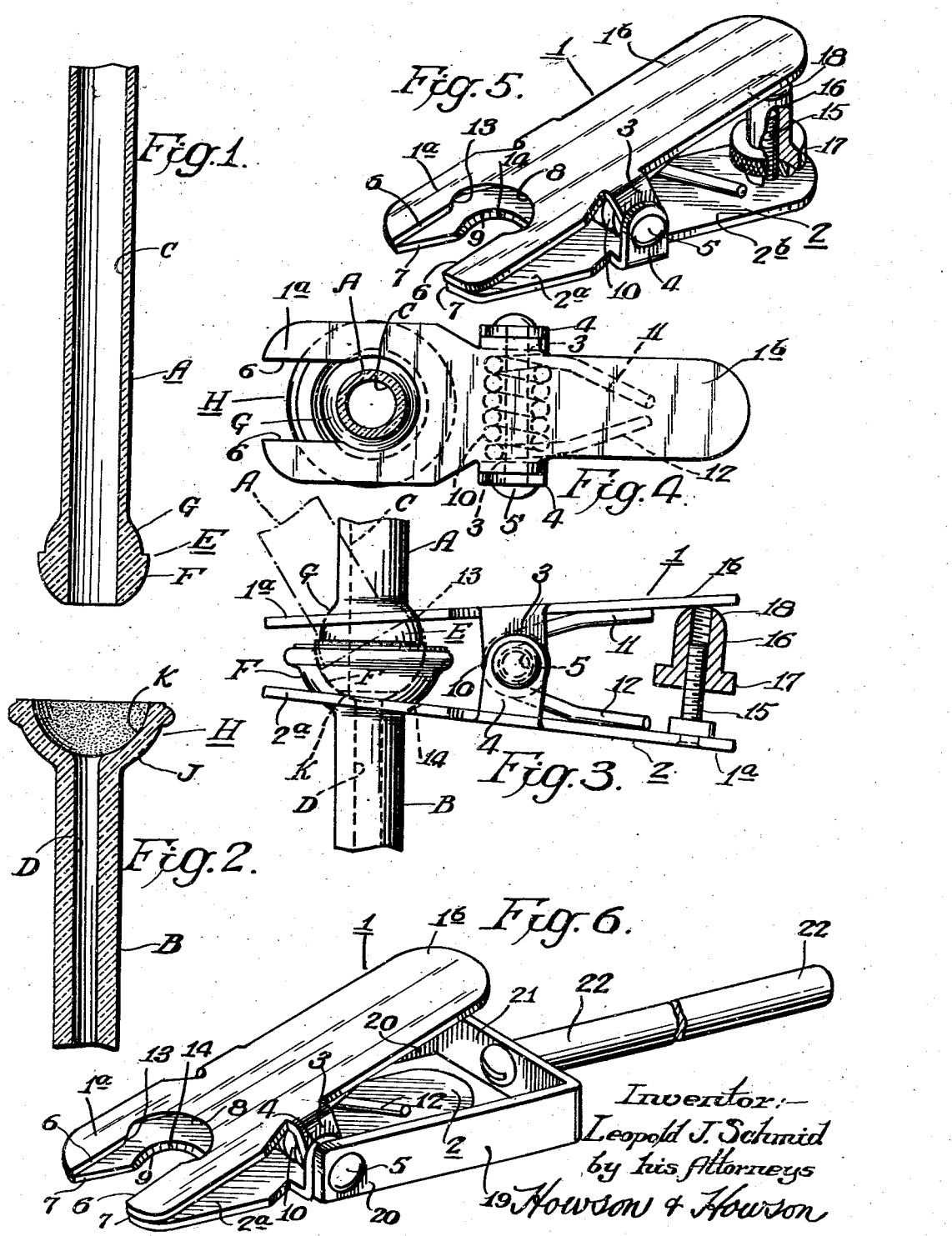

2,397,438

UNITED STATES PATENT OFFICE 2,397,438

CONNECTOR FOR CHEMICAL AND LABORATORY TUBING

Leopold J. Schmid, Philadelphia, Pa., assignor to Arthur H. Thomas Company, Philadelphia, Pa., a corporation of Pennsylvania Application October 13, 1942, Serial No. 461,884

3 Claims. (Cl. 285—91)

This invention relates to new and useful improvements in couplings for chemical and laboratory tubing of glass and the like, and more particularly to a novel connector device for use in conjunction with such couplings to secure the same together.

It has been the practice in chemical and laboratory apparatus to connect or couple together lengths of glass and other tubing by the use of relatively short lengths of rubber or like tubing which are force-fitted over the ends of the adjacent lengths of tubing that are to be connected or coupled together. This manner of coupling glass and like tubing together has many disadvantages; for example, a leak-proof connection is not always assured, the rubber connectors deteriorate with age, become hard and cracked; and in many cases where such a connection remained assembled for substantial periods of time the rubber connectors adhered to the tubing and the assembly could be taken apart only by destroying the rubber connector. Also, in many instances the rubber of the connector is attacked by the chemical passing therethrough.

Recently, however, there has been devised, and appeared on the market, glass and like tubing for chemical and laboratory use wherein successive lengths of such tubing are coupled together by means of a universal joint or connection. This has been accomplished by providing at one end of a tube a spherical or ball-like portion and at the adjacent end of the next tube a correspondingly shaped recess or socket to receive the spherical portion of the first named tube. These spherical and recessed portions have their complementary surfaces accurately formed to provide a tight and leak-proof ball and socket joint or connection between the tubes upon interengagement of the spherical and recessed portions of adjacent tubes.

Notwithstanding the decided benefits and advantages inherent in chemical and laboratory tubing constructed to provide a ball and socket connection of adjacent tubes, the use of such tubing has been materially retarded by the lack of an adequate and practical device for securing the ball and socket joint of the tubing in firmly assembled relation, and while one or more such devices are available they are cumbersome and at the same time tedious to apply because of the fact that it is quite difficult, if not impossible, for a person to hold the tubing together and at the same time apply and secure in place such holding device.

With the foregoing in mind, the principal object of the present invention is to provide a relatively simple and highly practical connector for securing together the ball and socket joint or coupling of chemical and laboratory tubing.

Another object of the invention is to provide a connector of the character described which can be readily and easily applied and removed from the ball and socket couplings of such tubing with a minimum of effort.

Another object of the invention is to provide a connector of the stated kind which is operable to hold the ball and socket coupling firmly together to provide both a leak-proof joint between the tubing and prevent accidental opening or separation of the coupling during use.

A further object of the invention is to provide a connector of the type set forth having means for positively securing said connector in holding relation upon the ball and socket coupling of the tubing.

A still further object of the invention is to provide a connector of the stated character having means for mounting or supporting the said connector and tubing in predetermined positions.

These and other objects of the invention and the various features and details of the construction and operation thereof are hereinafter fully set forth and described and shown in the accompanying drawing, in which:

Figures 1 and 2 are views in section axially through portions of chemical and laboratory glass tubing provided respectively with ball and socket portions for connecting or coupling the same together.

Figure 3 is a view in elevation showing the ball and socket coupling in assembled relation with a connector embodying the present invention positioned to secure the same together.

Figure 4 is a view in plan of the disclosure in Figure 3.

Figure 5 is a view in perspective of a connector made according to the present invention; and Figure 6 is a view in perspective of a connector device showing a modification of the construction thereof together with an added feature contemplated by the present invention.

Referring now more particularly to the drawing, Figures 1 and 2 show chemical and laboratory tubing of glass or the like with which the connector of the present invention is adapted to be used. As will be seen, this tubing comprises sections or pieces of tubing A and B having therethrough a bore or passage C and D, respectively, of suitable diameter. At one end of the tube A there is provided or formed an enlarged portion E having an outer or endwise surface portion of substantially semi-spherical shape as indicated at F and an inner, though smaller, semi-spherical surface portion G. On the other hand, the tube B, at the end thereof adjacent the tube A, is provided with an enlarged portion H of generally cup-shape having an inner convex semi-spherical surface J and an endwise facing concave recess K the surface of which likewise is substantially semi-spherical in shape accurately corresponding with the semi-spherical surface portion F of the first tube A so as to interengage therewith in the manner and relation shown in Figure 3 of the drawing thereby providing a ball and socket joint or coupling between the said tubes A and B.

For securing the ball and socket joint, as well as the tubes A and B in the assembled relation shown in Figure 3, there is provided a novel connector device, and according to the present invention this connector comprises a pair of substantially similar flat body members 1 and 2 including bifurcated or slotted end portions 1a and 2a and handle or operating end portions 1b and 2b, respectively. These two body members are provided approximately midway at opposite sides thereof with a pair of lugs or the like 3 and 4, respectively, which extend at right angles to the plane of their respective body members in the direction of the other body member. The two body members 1 and 2 are pivotally connected together, with their end portions correspondingly positioned, by means of a single pin or rivet element 5 which extends through openings formed in each of said pairs of lugs 3 and 4 respectively as shown in Figure 5 of the drawing.

The corresponding bifurcated end portions 1a and 2a of each body member 1 and 2 of the connector are formed to provide straight sided slot portions 6 and 7, respectively, therein which extend longitudinally inwardly from the end of the body members 1 and 2, and terminate at their inner ends in slot portions 8 and 9, respectively, of substantially circular configuration or shape having a diameter somewhat greater than the width of the straight sided slot portions 6 and 7.

According to the invention suitable spring means is interposed between the two body members 1 and 2 and arranged to bias them in respectively opposite directions about the pin or rivet 5 so as to tend to close the bifurcated ends 1a and 2a thereof toward and against each other in the relation shown in said Figure 5. Thus, for example, as shown in the drawing, a spring 10 may embrace the single pin or rivet element 5 that serves to pivotally connect the body members 1 and 2 together, and the opposite ends of said spring 10 may extend endwise between and in contact with the inner surfaces of the handle portions 1b and 2b of the body members at the opposite side of the pairs of lugs 3 and 4 from the bifurcated ends of said body members 1 and 2, as indicated at 11 and 12, respectively, thereby tending to urge them apart or away from one another as indicated and close the bifurcated end portions upon each other.

The connector may be applied to the ball and socket joint or coupling to secure the same and the tubes A and B together merely by grasping the portions 1b and 2b of the body members 1 and 2, and then compressing them against the action of spring 10 to relatively separate the bifurcated end portions 1a and 2a of said body members. The tubes A and B with the ball and socket joint assembled as shown in Figure 3 of the drawing are then passed inwardly of the slots 6, 7 and 8, 9 in the body members 1 and 2 of the connector so that the ball and socket joint resides or is interposed between the bifurcated end portions 1a and 2a of said body members. Pressure on the remote ends 1b and 2b thereof may then be released to allow the spring 10 to close the bifurcated ends of the body members 1 and 2 upon the respective elements of the ball and socket joint in the relation shown in said Figure 3 with the circular slot portions 8 and 9 in the body members 1 and 2 engaging upon the adjacent surfaces of the enlarged end joint portions G and J of the tubes A and B respectively. Since these adjacent portions G and J have substantially spherical surfaces the inner or engaging edges of the circular slot portions 8 and 9 of the slot openings are preferably beveled as indicated at 13 and 14 to provide better engagement and fit upon the joint surfaces by the body members. Of course, to release the connector for disconnection or disassembly of the joint and tubes, it is only necessary to effect a relative separation of the bifurcated ends of the body members as previously described and then remove the connector.

In many instances, and particularly those where tubing of the smaller range of diameters is employed, the force or power of the spring 10 is sufficient to securely hold the ball and socket joint in assembled relation and prevent accidental disconnection or separation thereof. However in certain instances, and generally in those cases where tubing of relatively large diameter is employed, it is desirable that the spring 10 be augmented with a suitable mechanism for positively securing or locking the connector in holding relation upon the ball and socket joint of the tubes. Accordingly, there may be provided between the handle or operating ends 1b and 2b of the body members 1 and 2 of the connector, at the opposite end from the bifurcations, a member operatively adjustable to hold these portions of said body members in relatively spaced apart relation to prevent opening or separation of the bifurcated ends thereof.

Thus, as shown in the drawing, there may be provided a threaded stud or the like 15 which is secured to one handle end portion of one of the body members remote from its bifurcated end and this stud 15 is arranged to extend perpendicularly from said one body member toward the other body member. On this stud 15 there is threaded a nut or similar member 16 having an enlarged knurled portion 17 at the base thereof for rotating the same and a rounded outer end portion 18 for engagement with the inner side of the other body member as shown in Figure 3 of the drawing. Accordingly, when the connector has been applied to the ball and socket joint as previously described, the member 16 may be extended along the threaded stud 15 so as to engage the end 18 of said member 16 against the inner surface of the handle portion of said other body member thereby securing and locking the bifurcated ends of the two body members against relative separation.

The connector also may be provided with a suitable structure facilitating the mounting and support of said connector and tubing in predetermined positions. In chemical and laboratory work it is quite often necessary to support tubing in various positions above the level or surface of the laboratory table or apparatus. This is usually done by means of a suitable elevated standard or upright having thereon a clamp adapted to grip the tubing. Such manner of support sometimes results in breakage of the tubing and is cumbersome and difficult to adjust.

According to the present invention provision may be made for supporting tubing in predetermined positions through the connector which secures together the ball and socket joint as aforesaid. To this end, therefore, the connector may be provided with a yoke member 19 of generally U-shape, the ends 20 of which may be pivotally mounted upon the pin or rivet element 5 of the connector as shown in Figure 6 of the drawing. Extending outwardly from the base portion 21 of the yoke is a rod or the like 22 which may be secured in a laboratory support in the usual manner thereby not only supporting the coupling or joint connector but also, through it, supporting the adjacent tubing.

From the foregoing it will be seen that the present invention provides a novel connector for the ball and socket couplings of chemical and laboratory tubing which is relatively simple, yet highly practical and readily and easily applied and removed from such coupling or joint. Too, the present invention insures a leak-proof connection between adjacent tubes and precludes accidental separation thereof. In addition, the connector provides for the positive locking or securing of the connector upon the joint or connection and provision is made also for mounting and supporting of the tubing through the joint connector.

While a particular embodiment of the invention has been herein illustrated and described, it is not intended that the invention be limited to such disclosure but that changes and modifications may be made thereto and incorporated therein within the scope of the annexed claims.

I claim:

1. A connector for securing together two pieces of tubing having complementary interengaging end portions providing a ball and socket joint therebetween, said connector comprising a pair of relatively flat body members each longitudinally bifurcated at one end and having an operating handle portion at the other end, means intermediate the ends of said body members pivotally connecting the same together in spaced apart relation with the bifurcated and handle end portions thereof correspondingly positioned, said bifurcated end portions of the body members providing an endwise opening slot longitudinally in each thereof arranged to receive and grip between the bifurcated ends of said members the ball and socket joint portions of such pieces of tubing, and spring means biasing the body members in respectively opposite directions about said pivot means to urge apart the handle portions of said members and to close against each other the bifurcated ends thereof thereby to secure together the ball and socket joint portions positioned therebetween.

2. A connector for securing together two pieces of tubing having complementary interengaging end portions providing a ball and socket joint therebetween, said connector comprising a pair of relatively flat body members each longitudinally bifurcated at one end and having an operating handle portion at the other end, means intermediate the ends of said body members pivotally connecting the same together in spaced apart relation with the bifurcated and handle end portions thereof correspondingly positioned, said bifurcated end portions of the body members providing an endwise opening slot longitudinally in each thereof arranged to receive and grip between the bifurcated ends of said members the ball and socket joint portions of such pieces of tubing, said slots being formed so that the edges thereof engage the outer curved surfaces of the ball and socket portions of said joint respectively whereby each of said portions may be angularly adjusted in the clamp with respect to the other portion and said slots being dimensioned so as to render the connector reversible, and spring means biasing the body members in respectively opposite directions about said pivot means to urge apart the handle portions of said members and to close against each other the bifurcated ends thereof thereby to secure together the ball and socket joint portions positioned therebetween.

3. A connector for securing together two pieces of tubing having complementary interengaging end portions providing a ball and socket joint therebetween, said connector comprising a pair of relatively flat body members each longitudinally bifurcated at one end and having an operating handle portion at the other end, means intermediate the ends of said body members pivotally connecting the same together in spaced apart relation with the bifurcated and handle end portions thereof correspondingly positioned, said bifurcated end portions of the body members providing an endwise opening slot longitudinally in each thereof arranged to receive and grip between the bifurcated ends of said members the ball and socket joint portions of such pieces of tubing, said slots having their edges recessed to provide inner rounded portions forming socket-like seats for the outer curved surfaces of the ball and socket portions of said joint respectively, said seats forming a mechanical interlock between the said bifurcated end portions of the connector members and the respective ball and socket portions of the joint precluding accidental displacement of the connector from the joint, and spring means biasing the body members in respectively opposite directions about said pivot means to urge apart the handle portions of said members and to close against each other the bifurcated ends thereof thereby to secure together the ball and socket joint portions positioned therebetween.

LEOPOLD J. SCHMID.